(12) United States Patent
Takagi et al.

(10) Patent No.: US 6,239,915 B1
(45) Date of Patent: May 29, 2001

(54) COMPOSITE DISPLAY APPARATUS

(75) Inventors: Akinari Takagi, Yokosuka; Shoichi Yamazaki, Yokohama, both of (JP)

(73) Assignee: Mixed Reality Systems Laboratory Inc., Kanagawa-ken (JP)

(*) Notice: Subject to any disclaimer, the term of this patent is extended or adjusted under 35 U.S.C. 154(b) by 0 days.

(21) Appl. No.: 09/266,855

(22) Filed: Mar. 12, 1999

(30) Foreign Application Priority Data

Aug. 26, 1998 (JP) .................................................. 10-239856

(51) Int. Cl.$^7$ ................................................. G02B 21/02
(52) U.S. Cl. ..................... 359/629; 359/631; 359/633; 359/727
(58) Field of Search ..................................... 359/629, 731, 359/633, 638, 727

(56) References Cited

U.S. PATENT DOCUMENTS 5,933,279 * 8/1999 Yamazaki .............................. 359/630

* cited by examiner

Primary Examiner—Georgia Epps
Assistant Examiner—Timothy Thompson
(74) Attorney, Agent, or Firm—Fitzpatrick, Cella, Harper & Scinto

(57) ABSTRACT

A composite display apparatus has a display device for displaying image information, a display optical system for guiding light from the display device to the eye of an observer, and an image pickup optical system for focusing light from the outside on an image pickup device. An optical axis of the image pickup optical system is substantially aligned with an axis that is an extension of the eye-ball optical axis in an optical path of the display optical system. The apparatus further has an optical path separating element for separating an optical path of the image pickup optical system from the optical path of the display optical system. Each of the display optical system and the image pickup optical system has a plurality of decentered reflective surfaces having curvature. The light from the display device is alternately folded in directions along the eye-ball optical axis by the plurality of reflective surfaces of the display optical system to be guided to the eye. The light from the outside is alternately folded in directions different from an observation direction by the plurality of reflective surfaces including the optical path separating element. The image pickup optical system has a stop and a rear optical system placed behind the stop. The image pickup optical system also has a surface having a negative power and a surface having a positive power in that order toward the stop in the optical path before the stop. The rear optical system is a refracting optical system or a reflecting optical system having a positive power.

20 Claims, 8 Drawing Sheets

COMPOSITE DISPLAY APPARATUS

BACKGROUND OF THE INVENTION

1. Field of the Invention

The present invention relates to a composite display apparatus incorporating an image pickup optical system for taking in light from image information of the outside to form an image thereof on an image pickup device and a display optical system for permitting an observer to observe the image information displayed on a display device such as a liquid crystal panel or the like, which is constructed in compact size as a whole, and, more particularly, to such apparatus suitably applicable to devices called head-mounted displays and goggle-type displays.

2. Related Background Art

The devices suggested heretofore include a device constructed in such structure that a compact CCD camera is mounted on a head-mounted display (HMD) and image information obtained from the compact CCD camera is displayed in the HMD as it is or a device constructed in such structure that the image information obtained from the compact CCD camera is processed and converted into some image information and the image information thus converted is displayed in the HMD. In addition, there are also a variety of suggestions about a seethrough HMD (the HMD having structure for permitting the light from the outside to be observed directly at the angular magnification 1) as a type of the HMD.

The HMD of this type will suffer parallax if the eye-ball optical axis of the display optical system for observing the image information displayed on the display device of the HMD is offset against the optical axis of the CCD camera for imaging the image information of the outside on the CCD surface. The devices having both the image pickup optical system and the display optical system without the parallax are suggested, for example, in Japanese Laid-open Patent Applications No. 4-22358 and No. 5-303053.

In the display optical system suggested in Japanese Laid-open Patent Application No. 4-22358, light emitted from a compact liquid crystal panel is guided via a flat half mirror and thereafter to the eye by an eyepiece. On the other hand, the image pickup optical system is arranged so that the light from the outside is guided via a flat half mirror and thereafter is focused on a compact camera. Since this flat half mirror was mounted at 45°, the scale of the apparatus tended to become large. In addition, the seethrough optical system was unable to be established, because there was the eyepiece in front of the eye.

Japanese Laid-open Patent Application No. 5-303053 discloses the structure that permits the seethrough optical system to be established, but the optical system was complex and the apparatus tended to become very large.

Further, in cases where a reflective liquid crystal panel was used as a display element, a separate illumination optical system had to be mounted and thus the scale of the overall apparatus tended to become large.

With the image observing apparatus including the HMDs and the like, a significant challenge is to decrease the scale and weight of the overall apparatus, because the apparatus is mounted on the head of the observer. There are also desires for compact apparatus having no parallax and permitting establishment of the seethrough optical system.

SUMMARY OF THE INVENTION

An object of the present invention is, therefore, to provide a composite display apparatus that permits the observer to observe the image information of the outside and the image information displayed on the display element both in a good condition while being constructed in compact size as a whole, by properly setting the structure of the image pickup optical system for imaging the image information of the outside on the surface of the image pickup device such as a CCD sensor and the structure of the display optical system including a prism body having a plurality of decentered reflective surfaces for guiding the light from the display element to the eye of the observer on the occasion of observation of the image information displayed on the display element such as the liquid crystal display or the like.

A composite display apparatus of the present invention is:

(1-1) a composite display apparatus comprising display means for displaying image information, a display optical system for guiding light from the display means to the eye of an observer, and an image pickup optical system for focusing light from the outside on an image pickup device, wherein an optical axis of the image pickup optical system is substantially aligned with an axis as an extension of the eye-ball optical axis in an optical path of the display optical system, the apparatus further comprises optical path separating means for separating an optical path of the image pickup optical system from the optical path of the display optical system, each of the display optical system and the image pickup optical system has a plurality of decentered reflective surfaces having curvature, the light from the display means is alternately folded in directions along the eye-ball optical axis by the plurality of reflective surfaces including the optical path separating means, of the display optical system to be guided to the eye, the light from the outside is alternately folded in directions different from an observation direction by said plurality of reflective surfaces including said optical path separating means, the image pickup optical system has a stop and a rear optical system placed behind the stop, the image pickup optical system comprises a surface having a negative power and a surface having a positive power in order toward the stop in the optical path before said stop, and said rear optical system is a refracting optical system or a reflecting optical system having a positive power.

Particularly, the composite display apparatus is characterized:

(1-1-1) in that said image pickup optical system comprises a refractive surface having a negative power and a reflective surface having a positive power;

(1-1-2) in that said image pickup optical system comprises a reflective surface having a negative power and a reflective surface having a positive power;

(1-1-3) in that said plurality of decentered reflective surfaces having curvature are surfaces having powers differing depending upon azimuths about the vertex of surface;

(1-1-4) in that said display optical system and said image pickup optical system comprises a prism having three or more different optical surfaces each having a power;

(1-1-5) in that one surface of said image pickup optical system is a surface forming said optical path separating means;

(1-1-6) in that said image pickup optical system is arranged to adjust focus by use of said rear optical system;

(1-1-7) in that a reflective surface of said image pickup optical system, a reflective surface of said display optical system, and said optical path separating means are comprised of a common surface;

(1-1-8) by comprising a seethrough optical system for guiding the light from the outside through said optical path separating means to the eye so as to permit the observer to observe the outside;

(1-1-9) by comprising transmitting means for transmitting the image information from said image pickup optical system to said display means;

(1-1-10) in that a view angle of an image of the outside displayed through said transmitting means is equal to or smaller than a view angle at which the light from the outside is incident directly to the eye;

(1-1-11) in that said display means comprises a reflective display element, the apparatus comprises an illumination optical system for guiding illumination light to the display element, the illumination optical system shares a partial optical system with said image pickup optical system and said display optical system, the illumination optical system is separated from the optical path of said display optical system by said first optical path separating means, and the illumination optical system is separated from said image pickup optical system by second optical path separating means;

(1-1-12) in that at least one of said first and second optical path separating means is a polarization beam splitter;

(1-1-13) in that said display optical system has a polarizing plate;

(1-1-14) in that the polarizing plate of said display optical system is rotatable;

(1-1-15) in that said illumination optical system has a polarizing plate;

(1-1-16) in that said image pickup optical system has a polarizing plate;

(1-1-17) in that the polarizing plate of the image pickup optical system is rotatable; and so on.

Another composite display apparatus of the present invention is:

(1-2) a composite display apparatus comprising a display optical system having a plurality of reflective surfaces for guiding light from display means displaying image information to the eye of an observer, and an image pickup optical system having a plurality of reflective surfaces for focusing light from the outside on an image pickup device, wherein light passing through the image pickup optical system is separated in a reverse direction from an optical path of the display optical system by optical path separating means comprised of a decentered reflective surface having curvature, provided in the optical path, the display optical system comprises one reflective side of the reflective surface of the optical path separating means, the image pickup optical system comprises the other reflective side of the reflective surface of the optical path separating means, the image pickup optical system comprises a reflective surface having a positive power, a reflective surface having a negative power, a stop, and a rear optical system having a positive refractive power, and focus is achieved by use of the rear optical system.

Particularly, the composite display apparatus is characterized:

(1-2-1) in that said display means is illuminated with light from a light source by making use of said image pickup optical system and display optical system;

(1-2-2) in that the light from said light source is guided through a light splitting member to said image pickup optical system; and so on.

DETAILED DESCRIPTION OF THE PREFERRED EMBODIMENTS

Figure 1:
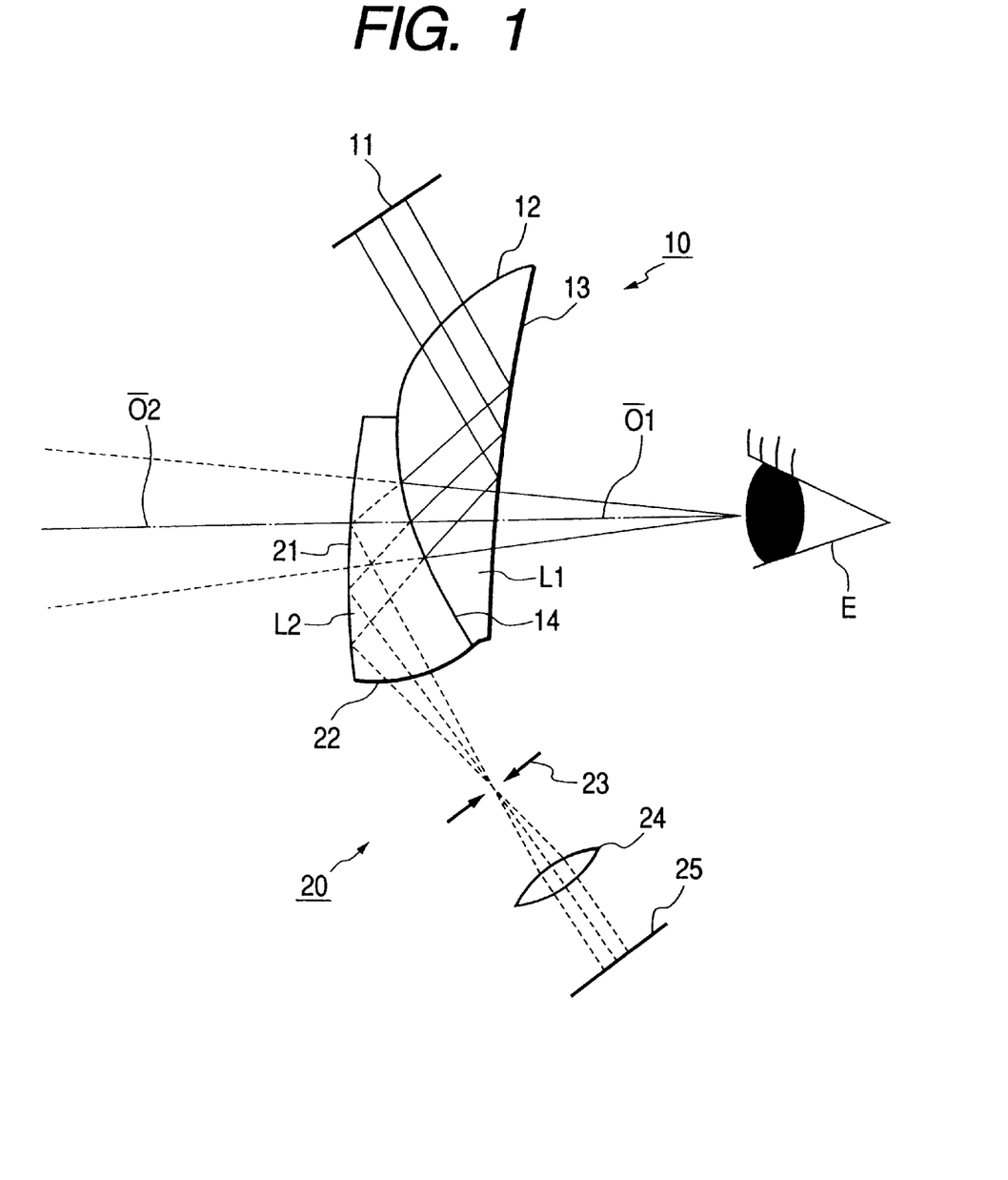
FIG. 1 is a schematic diagram to show the main part of Embodiment 1 of the present invention.

FIG. 1 is a schematic diagram to show the main part of Embodiment 1 of the present invention. The composite display apparatus of FIG. 1 has a display optical system 10 composed of a display element (display means) 11 and a prism body L1, and an image pickup optical system 20 composed of a prism body L2, a stop 23, a lens unit 24, and an image pickup device 25.

Light emitted from the display element 11 such as a transmission type liquid crystal panel equipped with a back light is refracted by a surface 12 of the prism body L1 to be incident into the prism body L1. Then the light is incident at an angle equal to or greater than the critical angle to a surface 13 to be totally reflected. The reflected light is further reflected by a mirror surface 14 having a positive power to be again incident at an angle below the critical angle to the surface 13. The light is refracted to leave the prism body L1 and be guided to the observing eye E. The display optical system is arranged as described above. The three surfaces 12, 13, and 14 of the prism body L1 have respective optical powers and form an enlarged virtual image of the display element 11 in front of the observer. The surface 12, the surface 13, and the surface 14 are rotationally asymmetric, aspherical surfaces having different powers depending upon azimuths about the vertex of each surface, whereby even the small number of optical elements can correct various aberrations caused by decentering of the optical system. If the surface 14 is a half mirror surface, the display information of the display element 11 can be observed as spatially being superimposed on the image information of the outside (an outside image) through the prism body L2 described hereinafter.

The light from the outside is refracted by a surface 21 of the prism body L2 to be incident into the prism body L2. Then the light is reflected by the mirror surface 14 having a negative power to be again incident at an angle over the critical angle to the surface 21 having a positive power to be totally reflected. The reflected light is refracted by a surface 22 to leave the prism body L2 and be guided to the stop 23. The light passing through the stop 23 is collected by the lens unit 24 having a positive power to form the image information of the outside (the outside image) on the image pickup device 25 such as the CCD sensor or the like.

The elements L2, 23 to 25 described above compose the image pickup optical system. The outside image obtained by the image pickup optical system is guided through an electric processing system (not illustrated) to be displayed on the display element 11 as it is or after converted into some image information. Then the observer observes the display image. The surface 21 and the surface 22 are rotationally asymmetric, aspherical surfaces having different powers depending upon azimuths about the vertex of each surface. This structure permits the positive power of the overall system to be dispersed with the stop 23 in between, thereby realizing the well-balanced image pickup optical system in terms of correction for aberration and the size of the optical system.

The optical systems can be constructed in the compact size because of the above-stated structure in which the optical paths of the display optical system and the image pickup optical system are separated by using the front and back of the mirror surface 14 having the power (the surface 14 thus composing the optical path separating means for separating the optical paths) and in which the optical paths are folded in reverse directions. The plurality of decentered reflective surfaces having curvature are made as prism surfaces in the integral form, which facilitates production.

The optical axis O1 of the display optical system is substantially aligned with the optical axis O2 of the image pickup optical system as illustrated in FIG. 1 and the view angle of the outside image picked up by the image pickup optical system display is equal to or smaller than the view angle at which the light from the outside directly enters the eye, thereby enabling the display and observation of a natural outside image without parallax.

If a synthesizing device not illustrated is used to synthesize the outside image picked up by the image pickup optical system and the display information generated by an information generating device not illustrated to display a synthesized image on the display element 11, no parallax will be encountered and thus the superimposed information can be seen as if it is of a real world.

Figure 2A:
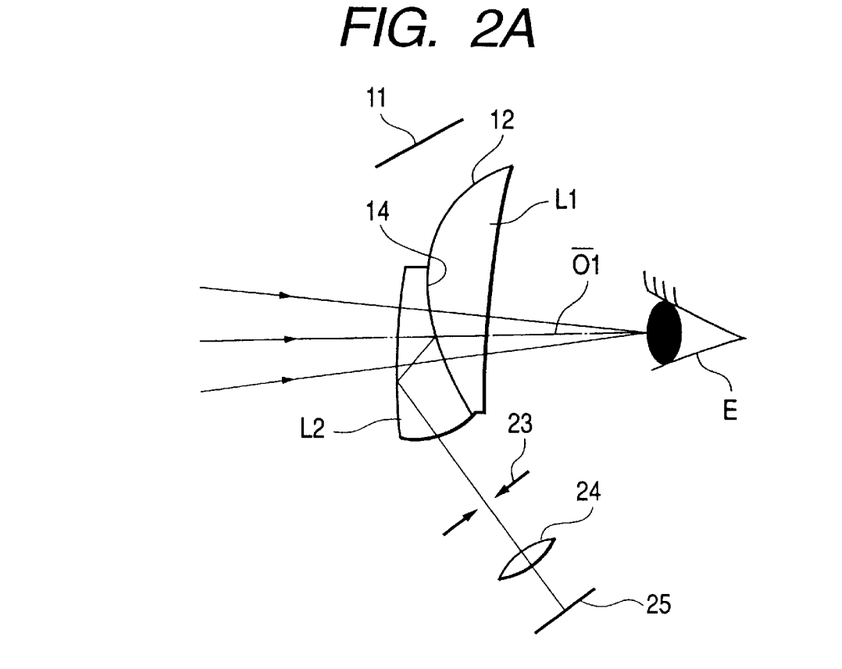
FIG. 2A and FIG. 2B are explanatory diagrams to illustrate modifications obtained by modifying part of FIG. 1.
Figure 2B:
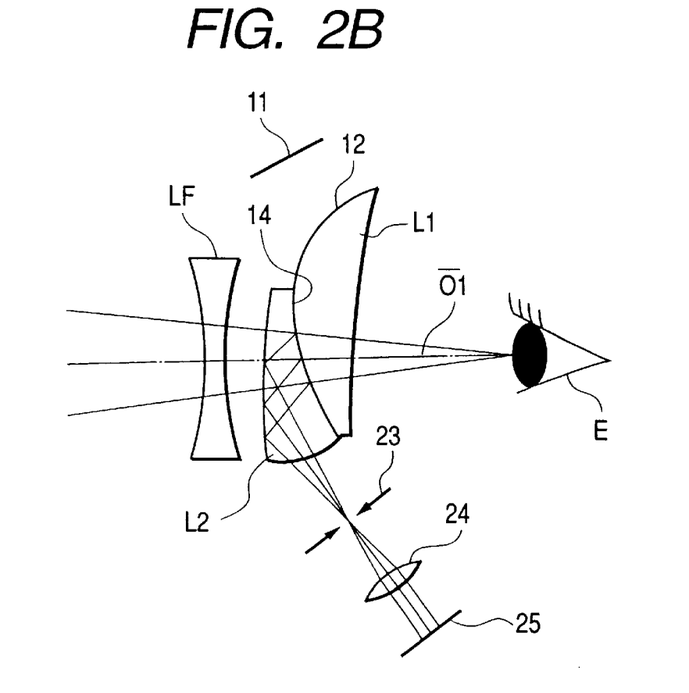

FIG. 2A is an explanatory diagram to illustrate a configuration in which the mirror surface 14 of FIG. 1 is replaced by a half mirror surface. When the mirror surface 14 is a half mirror as illustrated in FIG. 2A and when the refractive indices of the prism body L1 and prism body L2 are approximately equal, the display apparatus is provided with the seethrough function to permit the observer to observe the outside directly. FIG. 2B is an explanatory diagram to illustrate a configuration in which a lens LF is provided outside the prism body L2 of FIG. 1. The lens LF shown in FIG. 2B may have a power which is either positive or negative.

Figure 3:
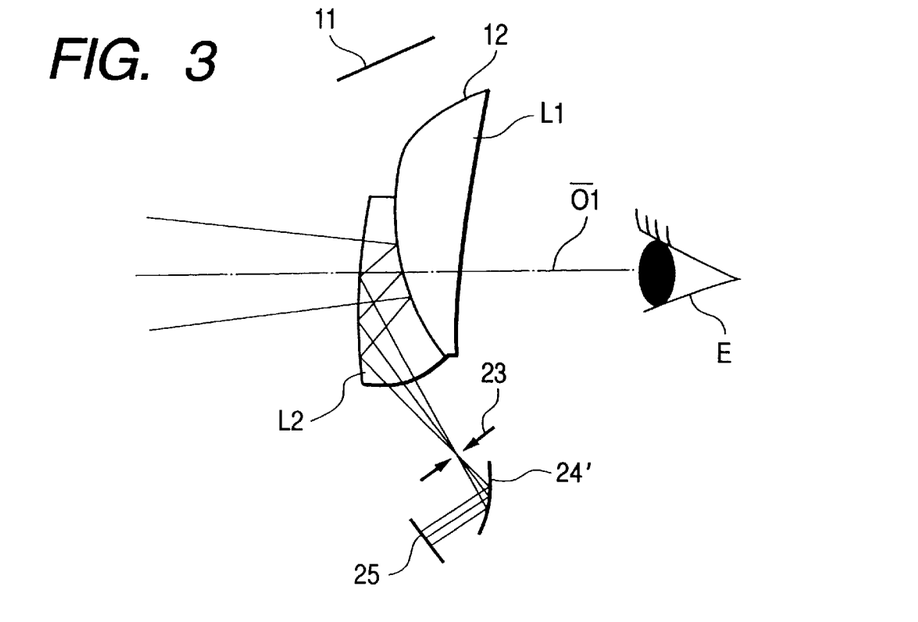
FIG. 3 is an explanatory diagram to illustrate a modification obtained by modifying part of FIG. 1.

FIG. 3 is an explanatory diagram to illustrate a configuration in which the lens unit 24 of the image pickup optical system of FIG. 1 is replaced by a reflective surface 24' having a positive power.

In the present embodiment the focus of the image pickup optical system is adjusted by the lens unit after the stop surface 23. This is because focusing is easier with the smaller optical element 24, 24' after the stop surface than the other optical elements.

FIG. 4 to FIG. 7 are schematic diagrams to show the main part of modifications obtained by modifying part of Embodiment 1 of the present invention. In FIG. 4 to FIG. 7 portions having the same functions as in the embodiment illustrated in FIG. 1 are denoted by the same reference symbols and will be omitted from the description.

Figure 4:
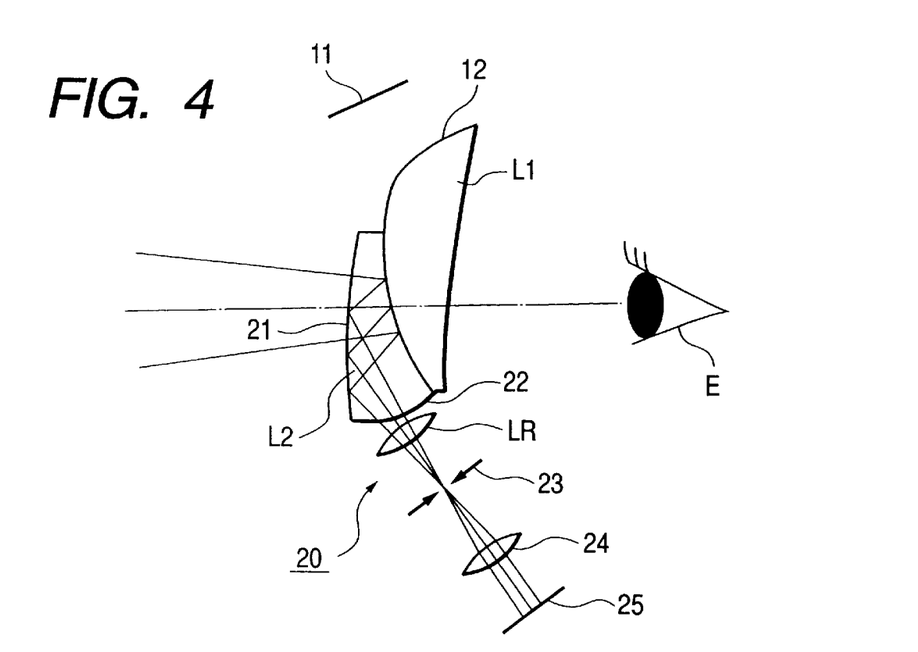
FIG. 4 is an explanatory diagram to illustrate a modification obtained by modifying part of FIG. 1.

The modification illustrated in FIG. 4 has the same structure as the embodiment illustrated in FIG. 1 except that an optical element LR is added between the prism body L2 and the stop 23 in the image pickup optical system 20 of the embodiment illustrated in FIG. 1. This structure permits the powers of the respective surfaces forming the prism body L2 to be set smaller, thereby enabling to provide a more compact optical system.

Figure 5:
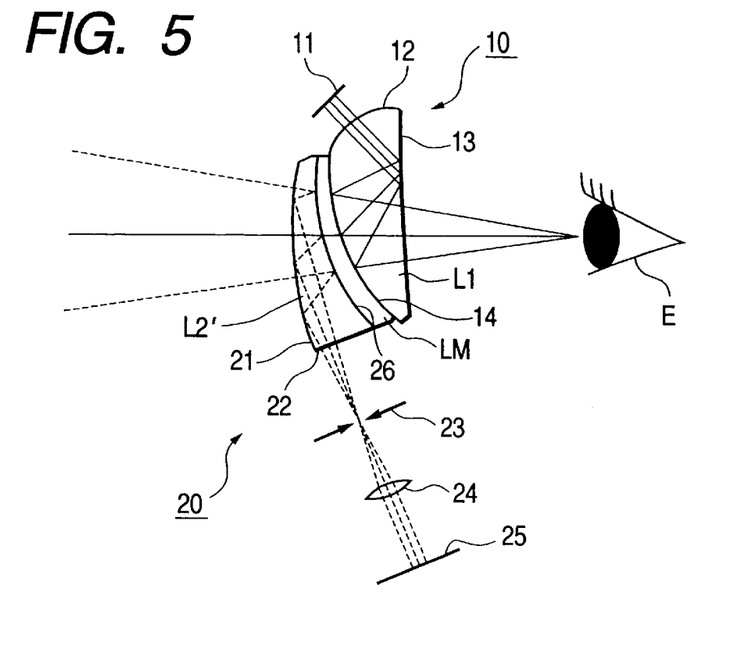
FIG. 5 is an explanatory diagram to illustrate a modification obtained by modifying part of FIG. 1.

The modification illustrated in FIG. 5 has the same structure as the embodiment illustrated in FIG. 1 except that a prism body LM is provided between the prism body L1 of the display optical system 10 and the prism body L2' of the image pickup optical system 20, as the optical path separating means of the embodiment shown in FIG. 1. When the reflective surface 14 of the display optical system 10 is separated from the reflective surface 26 of the image pickup optical system 20 as described, degrees of freedom of design are increased and thus the display optical system 10 and the image pickup optical system 20 can be corrected independently for aberration, thereby enabling to provide a composite display apparatus with higher performance. Here, the surface 14 of the prism body LM constitutes the optical path separating means of the display optical system 10, while the surface 26 of the prism body LM does the optical path separating means of the image pickup optical system 20.

Figure 6:
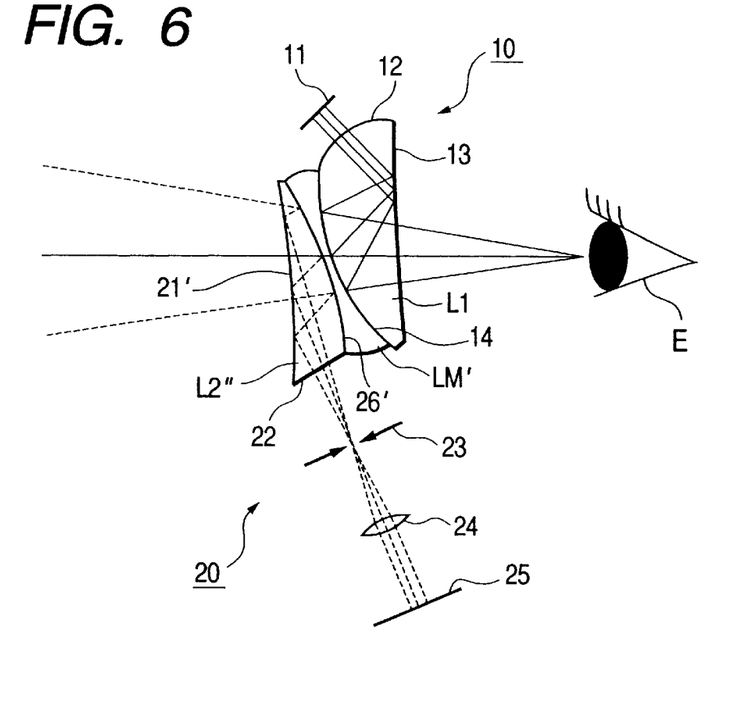
FIG. 6 is an explanatory diagram to illustrate a modification obtained by modifying part of FIG. 1.

The modification illustrated in FIG. 6 employs a prism body LM' as the optical path separating means, as in the case of the embodiment shown in FIG. 5. This modification has the same structure as the modification illustrated in FIG. 5 except that the outside surface 21' of the prism body L2" has a negative power and the surface 26' on the eye side has a positive power. The light from the outside is refracted by the surface 21' having the negative power to be incident to the prism body L2". Then the light is reflected by the mirror surface 26' having the positive power to be again incident at an angle over the critical angle to the surface 21' to be totally reflected thereby. The light is then refracted by the surface 22 to emerge from the prism body L2" and be guided to the stop 23. The optical path thereafter is the same as in the embodiment illustrated in FIG. 1. Here, the surface 14 of the prism body LM' constitutes the optical path separating means of the display optical system 10, while the surface 26' of the prism body LM' does the optical path separating means of the image pickup optical system 20.

Figure 7:
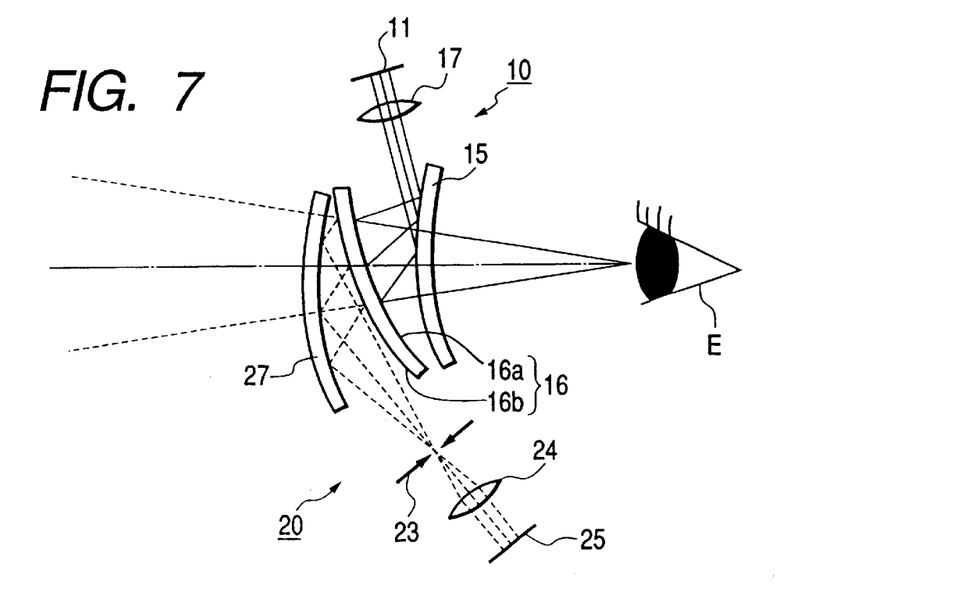
FIG. 7 is an explanatory diagram to illustrate a modification obtained by modifying part of FIG. 1.

In the modification illustrated in FIG. 7, the display optical system 10 and the image pickup optical system 20 are constructed of reflective mirror units and lens units. The light emitted from the display element 11 is refracted by a lens unit 17, is reflected by a half mirror 15 and an eye-side surface 16a of an mirror 16, and passes through the half mirror 15 to be guided to the eye E. The light from the outside passes through a half mirror 27, is reflected by an outside surface 16b of the mirror 16 having a negative power, and is reflected by the half mirror 27 having a negative power to be guided to the stop 23. The optical path thereafter is the same as in the embodiment illustrated in FIG. 1. Here, the surface 16a of the mirror 16 constitutes the optical path separating means of the display optical system 10, while the surface 16b of the mirror 16 does the optical path separating means of the image pickup optical system 20.

In the modifications illustrated in FIG. 5 and FIG. 6, the prism bodies LM and LM' may be made of an adhesive.

Figure 8:
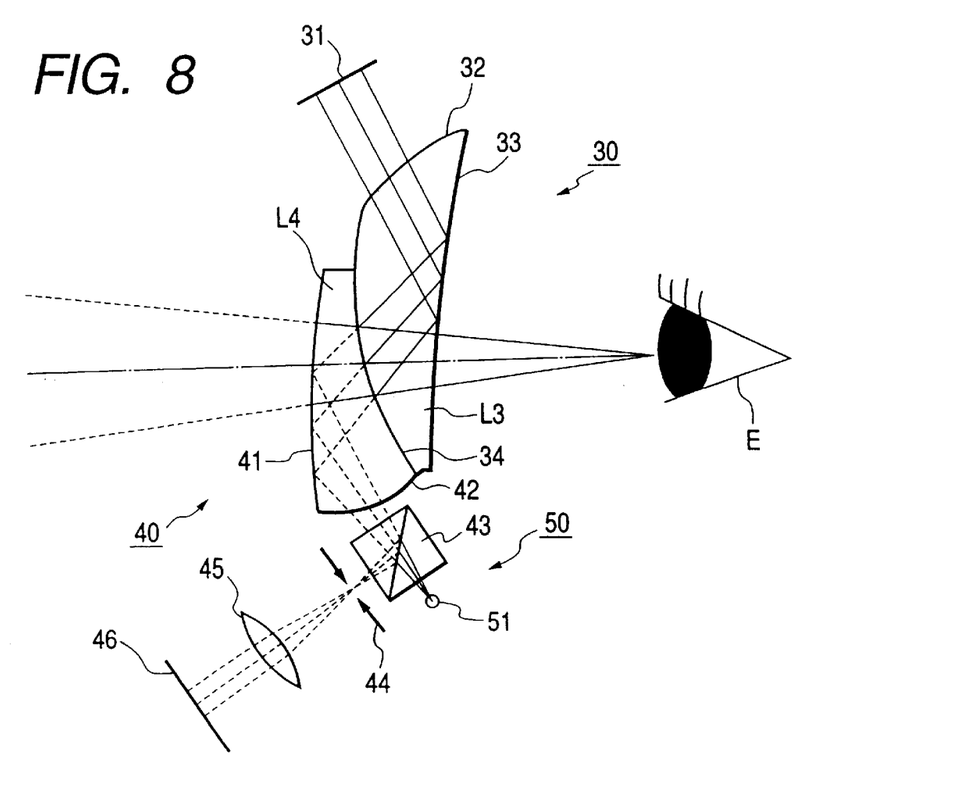
FIG. 8 is a schematic diagram to show the main part of Embodiment 2 of the present invention.

FIG. 8 is a schematic diagram to show the main part of Embodiment 2 of the present invention. The composite display apparatus illustrated in FIG. 8 has the display optical system 30 composed of a reflective display element 31 and a prism body L3, the image pickup optical system 40 composed of a prism body L4, a polarization beam splitter 43, a stop 44, a lens unit 45, and an image pickup device 46, and an illumination optical system 50 composed of the prism body L3 and prism body L4, the polarization beam splitter 43, and a light source 51.

An optical thin film with polarization selectivity as first optical path separating means is formed at the interface 34 between the prism body L3 and the prism body L4. The surface 34 and the polarization beam splitter 43 as second optical path separating means have such a property as to transmit the component of linearly polarized light whose direction of vibration of the electric vector is parallel to the plane of the drawing (hereinafter referred to as p-polarized light) but to reflect the component of linearly polarized light whose direction of vibration of the electric vector is normal to the plane of the drawing (hereinafter referred to as s-polarized light). The prism body L3 and prism body L4 are made of an optical material having little or no birefringence.

The light emitted from the light source 51 such as an LED passes through the polarization beam splitter 43 to become a beam of only p-polarized light. The p-polarized light is refracted by a surface 42 to enter the prism body L4. The incident light is incident at an angle over the critical angle to the surface 41 to be totally reflected. The reflected light passes through the surface 34 to enter the prism body L3. Then the light is incident at an angle over the critical angle to the surface 33 to be totally reflected. The reflected light is emergent from the prism body L3 as being refracted by the surface 32, then illuminating the display element 31.

The display element 31 is a reflective display element, for example, like a reflective liquid crystal panel, which has such a reflection property as to rotate the vibration direction of the electric vector of the incident light 90° where the display is "white" but to retain the vibration direction where the display is "black".

The light reflected by the display element 31 under the illumination by the illumination optical system 50 is incident to the prism body L3 as being refracted by the surface 32 of the prism body L3. Then the light is incident at an angle over the critical angle to the surface 33 to be totally reflected. The reflected light is guided to the interface 34 having a positive power. Since the plane of polarization of reflected light from pixels in the "white" state in the display element 31 was rotated 90°, the reflected light became s-polarized light. Therefore, it is reflected by the interface 34 to be again incident at an angle below the critical angle to the surface 33 to be refracted by and be emergent from the prism body L3. The light is thus guided to the observing eye E.

On the other hand, the reflected light from pixels in the "black" state in the display element 31 is retained as p-polarized light. Therefore, it is transmitted by the interface 34, is reflected by the surface 41, is refracted by the surface 42 to leave the prism body L4, and is transmitted by the polarization beam splitter 43. Therefore, the reflected light from the display element 31 is not incident to the image pickup device 46, so as to be prevented from being projected thereonto.

The s-polarized light component among the light from the outside is refracted by the surface 41 having a positive power to enter the prism body L4, is reflected by the interface 34 having a negative power, is again incident at an angle over the critical angle to the surface 41 to be totally reflected, is refracted by the surface 42 to leave the prism body L4, and is reflected by the polarization beam splitter 43 to be guided to the stop 44. The light passing through the stop 44 is collected by the lens unit 45 having a positive power to form the outside image on the image pickup device 46 such as the CCD sensor.

On the other hand, the p-polarized light component is incident from the surface 41 into the prism body L4, is transmitted by the interface 34 to enter the prism body L3, and is emitted from the surface 33 to be guided to the observing eye E. The seethrough optical system is thus established. In this case the seethrough optical system is arranged to have substantially no power by optimizing the shapes of the surface 41 and surface 33.

Figure 9A:
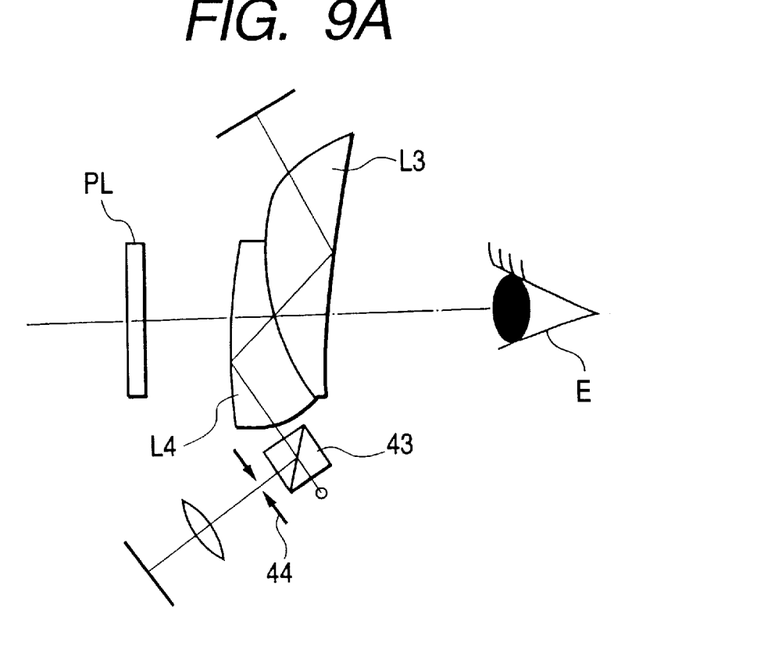
FIG. 9A and FIG. 9B are explanatory diagrams to illustrate modifications obtained by modifying part of FIG. 8.
Figure 9B:
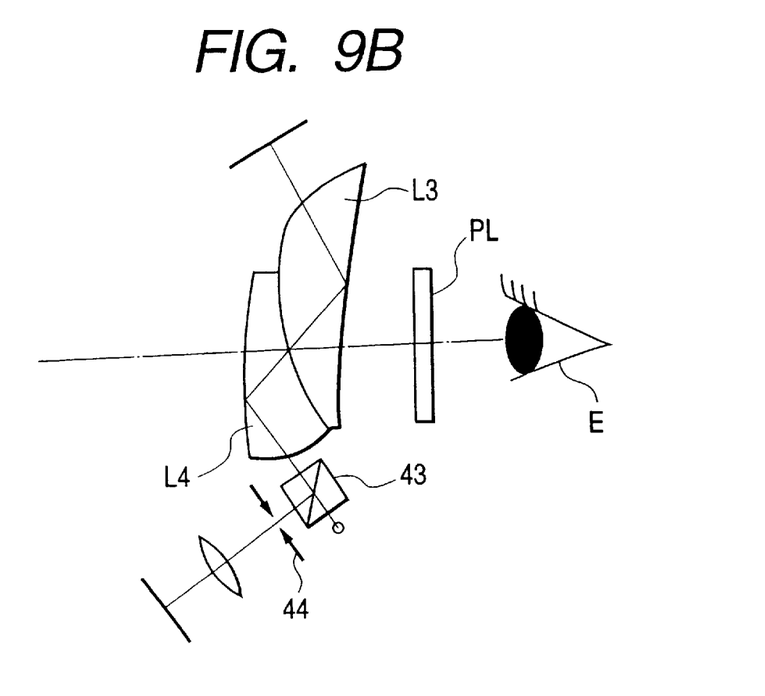

FIG. 9A and FIG. 9B are examples in which a polarizing plate PL is placed on the outside of the prism body L4 or on the inside of the prism body L3 so as to transmit only the s-polarized light. This can intercept the light so as to prevent the light from the outside from reaching the eye E. Further, a rate of quantity of light from the display element and quantity of light from the outside can be adjusted by controlling an angle of the polarizing plate.

Figure 10A:
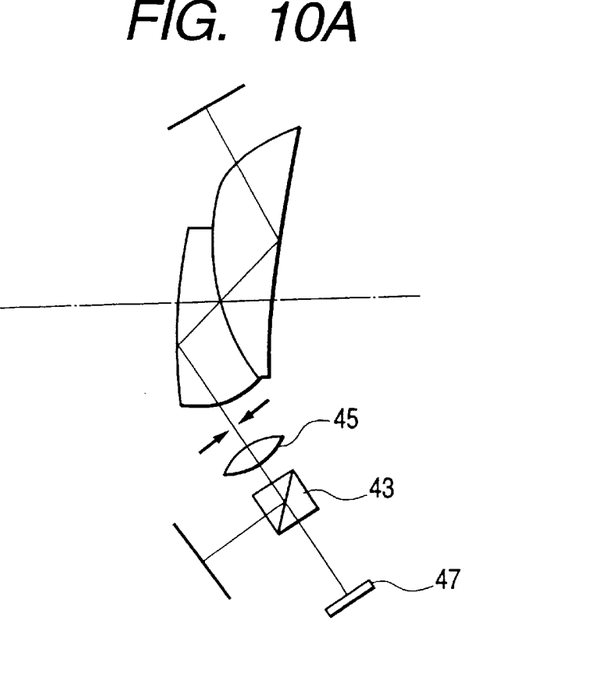
FIG. 10A and FIG. 10B are explanatory diagrams to illustrate modifications obtained by modifying part of FIG. 8.
Figure 10B:
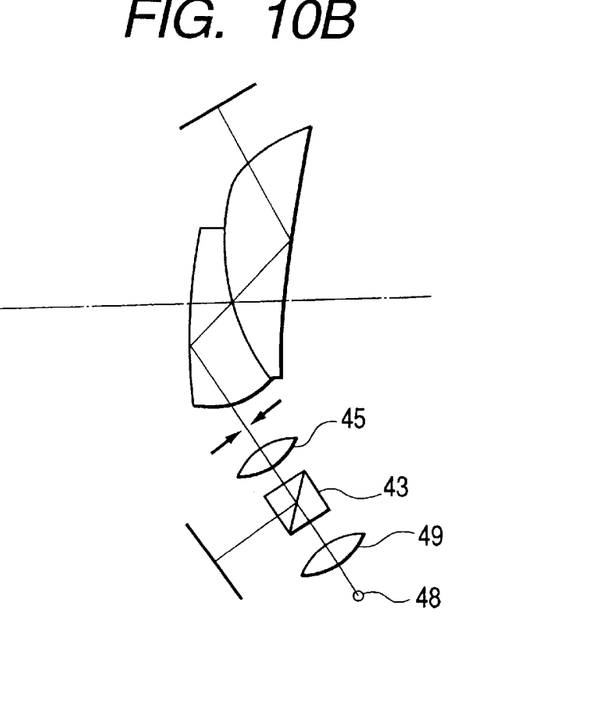

In this structure the polarization beam splitter 43 is placed in front of the stop 44 of the image pickup optical system, whereas the polarization beam splitter 43 may also be placed after the rear optical system 45 of the image pickup optical system 40, as illustrated in FIG. 10A and FIG. 10B. FIG. 10A shows an example in which a surface illuminant 47 is used as a light source, while FIG. 10B shows an example in which an almost point source 48 such as the LED is used in combination with a condenser lens 49.

Figure 11:
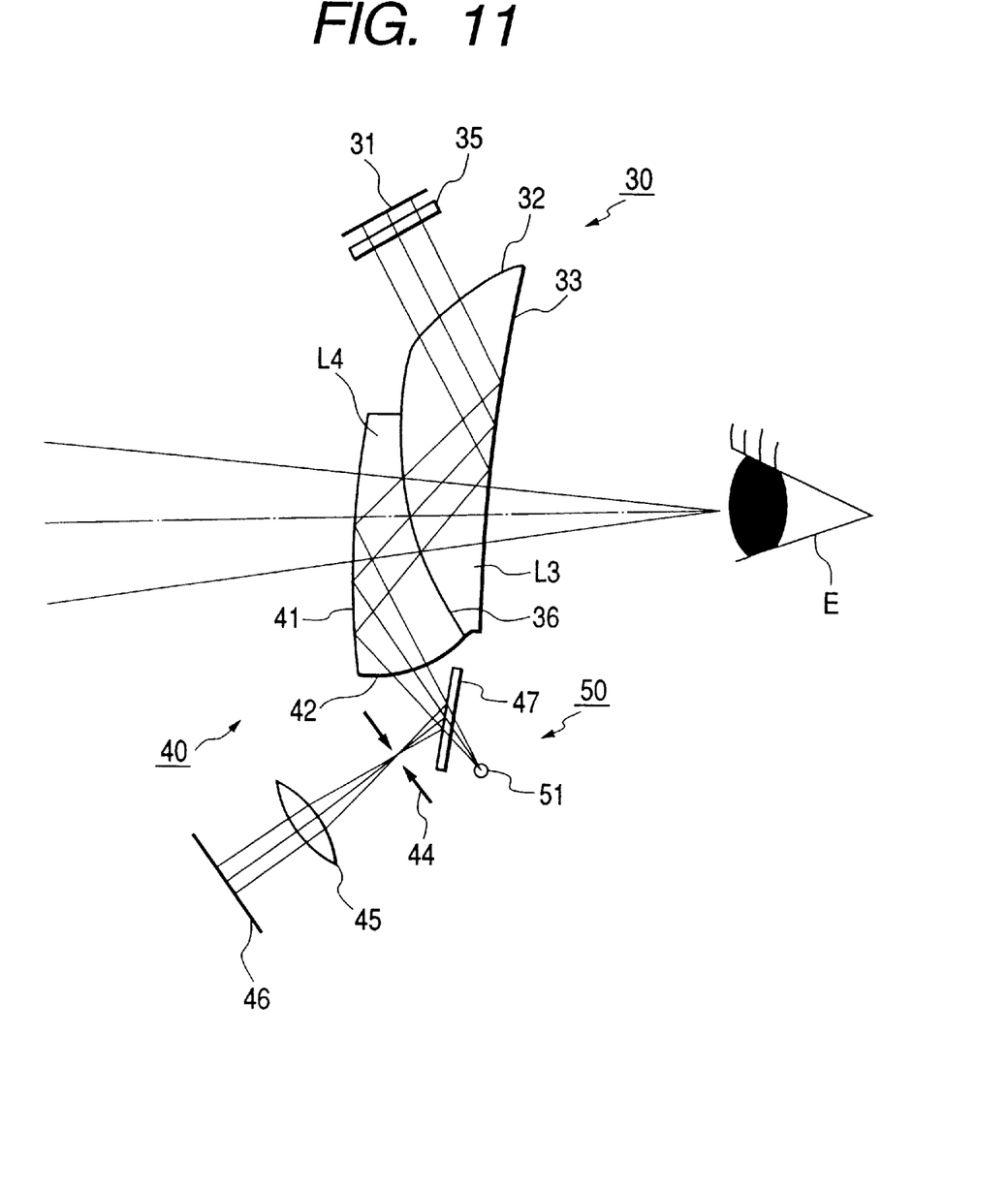
FIG. 11 is a schematic diagram to show the main part of Embodiment 3 of the present invention.

FIG. 11 is a schematic diagram to show the main part of Embodiment 3 of the present invention. In FIG. 11 elements having the same functions as those in Embodiment 2 of FIG. 8 are denoted by the same numerals. The present embodiment is different from Embodiment 2 in that a polarizing plate 35 is provided in the display optical system 30, the interface between the prism bodies L3 and L4 is a half mirror (first optical path separating means) 36, and the second optical path separating means for separating the optical paths of the illumination optical system 50 and the image pickup optical system 40 is constructed of a half mirror 47.

The light emitted from the light source 51 such as the LED is transmitted by the half mirror 47 and is refracted by the surface 42 of the prism body L4 to enter the prism body L4. The incident light is incident at an angle over the critical angle to the surface 41 to be totally reflected, is transmitted by the surface 36 to enter the prism body L3, and is incident at an angle over the critical angle to the surface 33 to be totally reflected. The reflected light is emergent from the prism body L3 as being refracted by the surface 32. The light then passes through the polarizing plate 35 to become, for example, only the p-polarized light component, thus illuminating the display element 31.

The display element 31 is a reflective display element, for example, like a reflective liquid crystal panel, which has such a reflection property as to rotate the vibration direction of the electric vector of the incident light 90° where the display is "black" but to retain the vibration direction where the display is "white".

The light reflected by the display element 31 under the illumination by the illumination optical system 50 is incident to the polarizing plate 35 and only light from "white" pixels in the display, the direction of polarization of which was retained, is transmitted thereby. The light from the polarizing plate 35 is incident to the prism body L3 as being refracted by the surface 32. Then the light is incident at an angle over the critical angle to the surface 33 to be totally reflected. The reflected light is guided to the half mirror 36 having a positive power to be reflected. The reflected light is again incident at an angle below the critical angle to the surface 33 to be refracted and emitted from the prism body L3, and it is then guided to the observing eye E.

The light from the outside is refracted by the surface 41 having a positive power to enter the prism body L4. The incident light is reflected by the half mirror 36 having a negative power and is again incident at an angle over the critical angle to the surface 41 to be totally reflected. The reflected light is refracted by the surface 42 to leave the prism body L4. The light is then reflected by the half mirror 47 to be guided to the stop 44. The light passing through the stop 44 is collected by the lens unit 45 having a positive power to form the outside image on the image pickup device 46 such as the CCD sensor.

On the other hand, a beam of the part transmitted by the half mirror 36 is incident to the prism body L3, is emergent from the surface 33, and is guided to the observing eye E. This thus forms the seethrough optical system. In this case the seethrough optical system is arranged to have substantially no power by optimizing the shapes of the surface 41 and the surface 33.

Among the light from the display element 31, the beam of the part transmitted by the half mirror 36 reaches the image pickup device 46, but the display image can be prevented from being picked up, by driving the display and image pickup operations in time division or by interposing a polarizing plate in the image pickup optical system in the relation of crossed Nicols with the polarizing plate 35.

In Embodiment 3 the optical path separating means may also be placed after the rear optical system 45 of the image pickup optical system 40, as stated in Embodiment 2 (FIG. 10A and FIG. 10B). Further, Embodiments 2 and 3 can also employ the configuration using half mirrors for the surface 33 and surface 41 as in Embodiment 1, the configuration using a reflective surface for the rear optical system of the image pickup optical system (FIG. 3), the configuration using a lens placed before the prism body (FIG. 2B), or the configurations as illustrated in FIG. 4 to FIG. 7.

The present invention can provide the compact composite display apparatus according to the above structure in which the seethrough optical system can also be established in the type without parallax and the compact composite display apparatus even if the reflective liquid crystal panel is used as a display element.

In addition, the present invention can also achieve the composite display apparatus permitting the image information of the display element and the image information of the outside both in a good condition while achieving compactification of the overall apparatus, by properly adjusting the structure of the image pickup optical system for imaging the image information from the outside on the surface of the image pickup device such as the CCD sensor and the structure of the display optical system including the prism body having the plurality of decentered reflective surfaces for guiding the light from the display element to the observer's eye on the occasion of observation of the image information displayed on the display element such as the liquid crystal display.

What is claimed is:

1. A composite display apparatus comprising display means for displaying image information, a display optical system for guiding light from said display means to the eye of an observer, and an image pickup optical system for focusing light from outside on an image pickup device, wherein an optical axis of said image pickup optical system is substantially aligned with an axis that is an extension of an eye-ball optical axis in an optical path of said display optical system, said apparatus further comprises first optical path separating means for separating an optical path of said image pickup optical system from the optical path of said display optical system, each of said display optical system and said image pickup optical system comprises a plurality of decentered reflective surfaces having curvature, the light from said display means is alternately folded in directions along the eye-ball optical axis by said plurality of reflective surfaces, including said first optical path separating means, of said display optical system to be guided to the eye, the light from the outside is alternately folded in directions different from an observation direction by said plurality of reflective surfaces, including said optical path separating means, said image pickup optical system comprises a stop and a rear optical system placed behind said stop, said image pickup optical system comprises a surface having a negative power and a surface having a positive power in that order toward said stop in the optical path before said stop, and said rear optical system is a refracting optical system or a reflecting optical system having a positive power, and wherein said display means comprises a reflective display element, the apparatus comprises an illumination optical system for guiding illumination light to said display element, and the illumination optical system shares a partial optical system with said image pickup optical system and said display optical system.

2. The composite display apparatus according to claim 1, wherein said image pickup optical system comprises a refractive surface having a negative power and a reflective surface having a positive power.

3. The composite display apparatus according to claim 1, wherein said image pickup optical system comprises a reflective surface having a negative power and a reflective surface having a positive power.

4. The composite display apparatus according to claim 1, 2, or 3, wherein said plurality of decentered reflective surfaces having curvature are surfaces having powers differing depending upon azimuths about the vertex of surface.

5. The composite display apparatus according to claim 1, wherein said display optical system and said image pickup optical system comprise a prism having at least three different optical surfaces each having a power.

6. The composite display apparatus according to claim 1, wherein one surface of said image pickup optical system is a surface forming said optical path separating means.

7. The composite display apparatus according to claim 1, wherein said image pickup optical system is arranged to adjust focus by use of said rear optical system.

8. The composite display apparatus according to claim 1, wherein a reflective surface of said image pickup optical system, a reflective surface of said display optical system, and said optical path separating means are comprised of a common surface.

9. The composite display apparatus according to claim 1, comprising a seethrough optical system for guiding the light from the outside through said optical path separating means to the eye so as to permit the observer to observe the outside.

10. The composite display apparatus according to claim 1, comprising transmitting means for transmitting the image information from said image pickup optical system to said display means.

11. The composite display apparatus according to claim 10, wherein a view angle of an image of the outside displayed through said transmitting means is equal to or smaller than a view angle at which the light from the outside is incident directly to the eye.

12. The composite display apparatus according to any of claims 1–3 or 5–11, wherein the optical path of said illumination optical system is separated from the optical path of said display optical system by said first optical path separating means, and is separated from the optical path of said image pickup optical system by second optical path separating means.

13. The composite display apparatus according to claim 12, wherein at least one of said first and second optical path separating means is a polarization beam splitter.

14. The composite display apparatus according to claim 12, wherein said display optical system comprises a polarizing plate.

15. The composite display apparatus according to claim 14, wherein said polarizing plate of said display optical system is rotatable.

16. The composite display apparatus according to claim 12, wherein said illumination optical system has a polarizing plate.

17. The composite display apparatus according to claim 12, wherein said image pickup optical system has a polarizing plate.

18. The composite display apparatus according to claim 17, wherein the polarizing plate of the image pickup optical system is rotatable.

19. The composite display apparatus according to any one of claims 1 to 3 or 5–11, wherein said illumination optical system includes a light source for emitting the illumination light, and the apparatus further comprises control means for controlling said image pickup means and said light source such that said image pickup means effects image pickup when said light source does not emit the illumination light.

20. The composite display apparatus according to any one of claims 1–3 or 5–11, wherein the light from said display means is a linearly polarized light, and said image pickup optical system includes a polarizing beam splitter or polarizing plate so disposed in the optical thereof as to intercept the light from said display means.

* * * * *

UNITED STATES PATENT AND TRADEMARK OFFICE
CERTIFICATE OF CORRECTION

PATENT NO. : 6,239,915 B1
DATED : May 29, 2001
INVENTOR(S) : Akinari Takagi et al.

Page 1 of 1

It is certified that error appears in the above-identified patent and that said Letters Patent is hereby corrected as shown below:

Column 6,
Lines 24, 43 and 59, "does" should read -- constitutes --.
Line 50, "an" should read -- a --.

Column 10,
Lines 4 and 12, "eye-ball" should read -- eyeball --.

Column 12,
Line 18, "optical" should read -- optical path --.

Signed and Sealed this

Eighteenth Day of December, 2001

Attest:

Attesting Officer

JAMES E. ROGAN
Director of the United States Patent and Trademark Office

Disclaimer 6,239,915—Akinari Takagi, Yokosuka; Shoichi Yamazaki, Yokohama, both of Japan. COMPOSITE DISPLAY APPARATUS. Patent dated May 29, 2001. Disclaimer filed June 3, 2002, by the assignee, Mixed Reality Systems Laboratory.

Hereby enters this disclaimer to claims 1-20.

*(Official Gazette, July 16, 2002)*